United States Patent [19]

Oda et al.

[11] Patent Number: 4,541,850
[45] Date of Patent: Sep. 17, 1985

[54] SLURRY INPUT DEVICE

[75] Inventors: Ronald L. Oda; William T. Sweeney, both of Ponca City, Okla.

[73] Assignee: Conoco Inc., Ponca City, Okla.

[21] Appl. No.: 627,160

[22] Filed: Jul. 2, 1984

[51] Int. Cl.[4] .................................................. B01D 19/00
[52] U.S. Cl. .......................................... 55/204; 55/345; 55/52; 210/304; 210/519
[58] Field of Search .............. 55/44, 52, 201–204, 55/319, 345, 199; 210/201, 202, 519, 520, 522, 539, 304, 521

[56] References Cited

U.S. PATENT DOCUMENTS

| | | | |
|---|---|---|---|
| 660,214 | 10/1900 | Gathmann | 210/788 |
| 3,006,474 | 10/1961 | Fitch | 210/304 |
| 3,399,770 | 9/1968 | Salomon | 209/211 |
| 3,485,365 | 12/1969 | Keller | 210/519 X |
| 3,849,310 | 11/1974 | Condolios et al. | 210/520 X |
| 3,965,013 | 6/1976 | Jackson | 210/519 |
| 4,048,067 | 9/1977 | Cheng | 210/73 |
| 4,279,747 | 7/1981 | Chen | 210/522 X |
| 4,309,283 | 1/1982 | Vikiö et al. | 209/211 |
| 4,333,499 | 6/1982 | Beck et al. | 137/812 |

*Primary Examiner*—Charles Hart
*Attorney, Agent, or Firm*—William J. Miller

[57] ABSTRACT

An apparatus for injecting a slurry containing solids and entrapped air in a fluid carrier into a tank filled with fluid by injecting the slurry into a chamber in a manner to form a vortex so that the solids and fluids are centrifugally forced to the outside of the chamber and the air is centripetally forced to the center axis of the chamber and exhaust out the top. The liquid and solids remaining in the slurry are then transferred to a second location by gravity where the rotation is reduced and the slurry is then dropped out an opening into the fluid filled tank.

2 Claims, 1 Drawing Figure

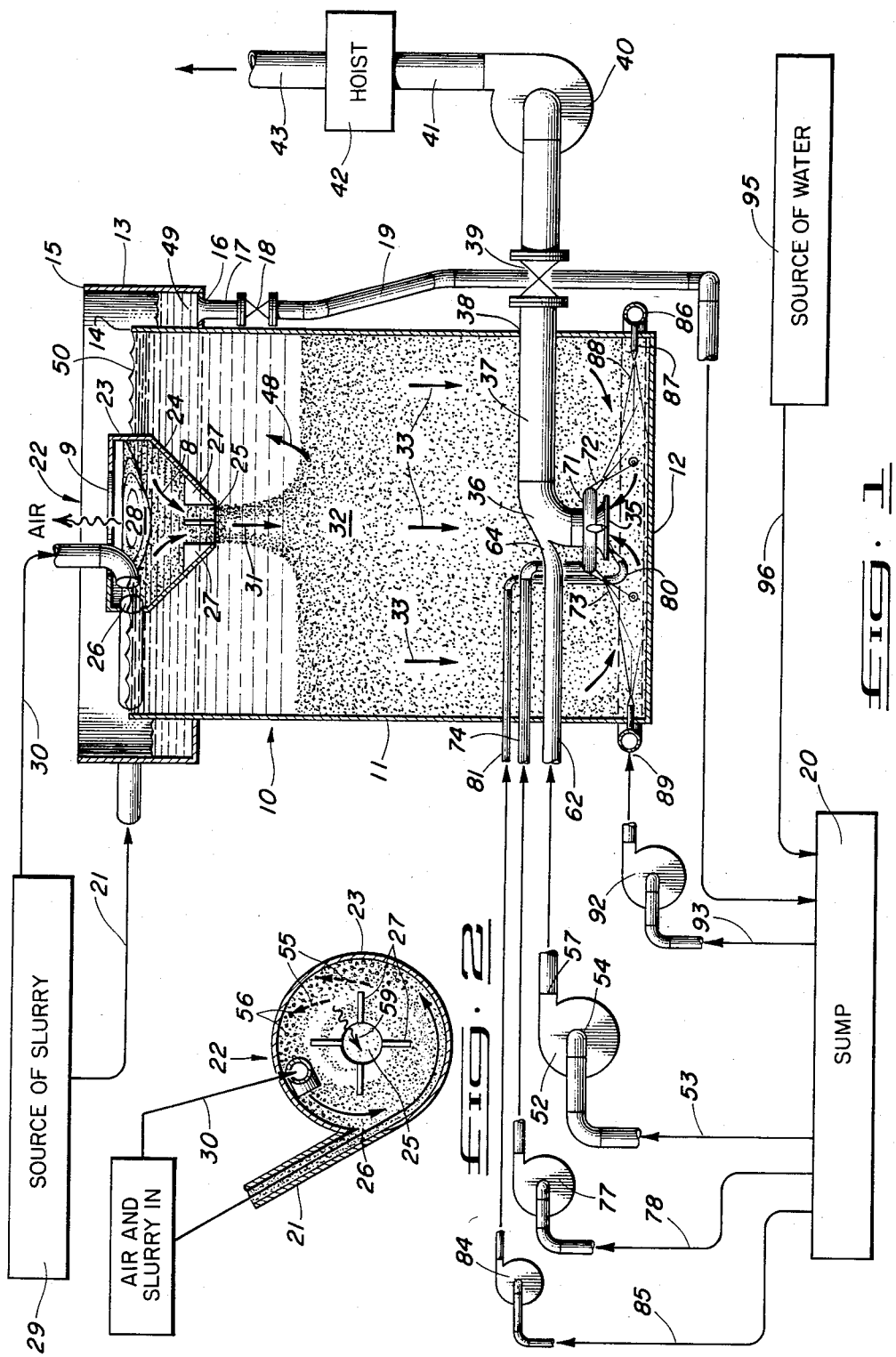

SLURRY INPUT DEVICE

BRIEF DESCRIPTION OF THE PRIOR ART

The best prior art known to applicants is U.S. Pat. No. 4,309,283 issued to Vikio et al; U.S. Pat. No. 3,399,770 issued to S. M. Salomon; and U.S. Pat. No. 4,333,499 issued to Jeffrey L. Beck et al. Of the above patents, U.S. Pat. No. 4,333,499 includes some of the mechanical features of this invention, namely, vertical vanes to halt rotation of fluid, but other features of the invention are drastically different from the invention claimed in this application.

BRIEF DESCRIPTION OF THE INVENTION

This invention described an apparatus for injecting a slurry from a pipeline into a fluid filled tank with substantially little turbulence as the material enters the tank. The invention is accomplished by mounting a chamber immersed in the tank fluid so that substantially all of the chamber is immersed in the fluid. The chamber is cylindrical with its axis aligned with the vertical axis of the tank. The pipeline enters the chamber on a tangent to a diameter of the cylindrical chamber so that the fluid and solids forming the slurry create a vortex in the chamber. Centrifugal forces moves the heavier solids to the outside wall of the chamber and gravity moves the solids down towards the exit at the bottom of the chamber. Simultaneously, centripetal force moves the entrapped, lighter air to the center axis of the chamber where it can exhaust out the top. At a lower location a plurality of vertical fins are interposed in the rotational path of the vortex. The rotational action of the vortex is reduced by the vertical vanes, thereby reducing the disturbance caused by the fluids and solids exiting the bottom of the chamber. Since the entrapped air has been removed, the solids will fall causing less disturbance to the bed of solids at the bottom of the tank.

One of the important features of this invention is the removal of the entrapped air from the slurry prior to its entry into the tank. If air were to enter along with the slurry falling into the tank, there would be substantially more turbulence. The bubbles would first be carried or swept toward the bottom with the material or solids and then rise upwardly into the fluid taking small solids with the bubbles of air. The solids would then pass over the top weir into the overflow causing a greatly increased solids flow rate and size of solids in the overflow portion of the tank.

BRIEF DESCRIPTION OF THE FIGURES

FIG. 1 is a cross-sectional view of a tank showing the slurry input device mounted in the tank; and FIG. 2 is a top view of the slurry input device shown in FIG. 1.

DETAILED DESCRIPTION OF THE INVENTION

Referring to both figures but in particular to FIG. 1, a slurry tank referred to by arrow 10 includes side wall 11 and a bottom 12. The side wall and bottom can be made of metal, cement or any other convenient material. The material actually used will depend upon where it is installed and the convenience of getting the particular material to the installation location. Overflow control means is provided by an enlarged portion of tank 13 surrounding the top 14 of tank 10 and having a top 15 higher than top 14 of tank 10. Portion 13 has a bottom 16 which encloses portion 13 to the escape of fluids. An overflow pipe 17 passes through a shutoff valve 18 and to subsequent pipe 19 which is coupled to a sump 20. Slurry is inputted from one mine face, for example, through pipe 21 to an inlet apparatus generally referred to by arrow 22. The inlet apparatus is anchored in any means such as bracing members (not shown) to tank side wall 11, enlarged portion 13, or mine roof or suitable independent structure (not illustrated). Inlet apparatus 22 basically functions to reduce the turbulence in a high velocity line entering a tank and generally is constructed of a cylindrical portion 23 and a conical portion 24 with an outlet 25. The fluids entering inlet apparatus from pipe 21 will generally be directed by means of the outlet 26 from pipe 21 so that it swirls around inlet apparatus 22. Once the material enters chamber 22 it forms a vortex 28 at the vertical axis of chamber 22. The centrifugal force of the vortex action slings the heavier solids to the outer wall 23 of chamber 22. Simultaneously, centripetal force moves the lighter entrapped air toward the axis of the vortex. It is extremely important in the operation of the overall apparatus shown in FIG. 1 to remove the entrapped air. This entrapped air is then removed through opening 9 in slurry input apparatus 22. The remaining material then falls by gravity as illustrated by arrows 8 to a second region containing vanes 27 where the solids will strike the vanes along with the rotating fluids, thus reducing the rotation of both the solids and the fluids. Once the rotation is slowed, the remaining material drops out the opening 25 in the direction of arrow 31 to the bed 32 in tank 10.

The removal of the slurry is accomplished by apparatus comprising a bell mouth 35 which communicates with a 90° elbow 36 with a horizontal pipe 37 which passes out an opening 38 in side wall 11 through a shutoff valve 39 to slurry pump 40. The output of pump 40 is connected to a pipe 41 which may be coupled to a hoist apparatus 42 if tank 10 is at a depth more than the final destination of the slurry. Hoist 42 communicates with a pipe 43 to the final destination of the slurry such as a preparation plant if the slurry were coal and water. It is obvious that, if the tank 10 is located on the surface, a hoist apparatus would not be necessary. Under these conditions pump 40 would communicate directly to a pipe 41 which would be connected to the end use apparatus of the slurry and not to a hoist.

A pump 52 will pump fluids from sump 20 up pipe 53 to the inlet 54 of pump 52. The outlet 57 of pump 52 is coupled through a pipe 62.

It is desirable that the slurry be maintained in a fluidized state near bell mouth 35 in tank 10. It is also desirable to maintain a fluidized state in the entire bottom of tank 10 when it is being cleaned out, especially if it has a flat bottom 12 as shown. To accomplish the fluidization several fluidizing jets are incorporated. The first series comprises a manifold 71 having a plurality of jets 72 mounted around it directed in a downwardly direction as illustrated by lines 73. Manifold 71 is coupled through a pipe 74 to a pump 77. Pump 77 gets its fluid from sump 20 through a line of pipe 78. A second jet 80 is mounted so that it will direct its jet into the bell mouth 35 to break up any solidified particles of slurry and to assist in the movement of slurry into the bell mouth. Jet 80 is coupled through a pipe 81 through a cutoff valve and a check valve (not shown) to a pump 84. Pump 84 gets its fluid from sump 20 coupled through a pipe 85. A third series of fluidizing jets for assisting in cleaning out tank 10 is coupled around the outside of tank 10 by means of a circular pipe manifold 86 which has a plurality of jets 87 passing through the side wall of tank 10 and directed along the bottom as illustrated by lines 88. Circular pipe 86 is, likewise, coupled through a pipe 89 through a cutoff valve and a check valve (not shown) to pump 92. Pump 92 gets its fluid from sump 20 coupled through a pipe 93. A source of water 95 is coupled through a pipe 96 to sump 20.

OPERATION

Before describing the operation of inlet apparatus 22, an overall description of the reclamation device is necessary. The reclamation device basically comprises tank 10 which is dimensioned to hold the required slurry necessary for the mining operation contemplated, that is, the tank must be sized to maintain a steady outward, uniform density slurry with varying amounts of slurry at the input. A source of slurry 29 can be a mine face underground or a surface mine and can be any material such as phosphate, coal, iron ore or any other product. This description will be limited to that used in coal; however, the apparatus is not limited to the use of coal.

When the material is formed at slurry source 29, it is communicated through pipes 21 or 30 to the inlet apparatus 22. Generally the inlet 26 will be formed to cause the material to swirl around the inside of inlet apparatus 22. The turbulence at the inlet is reduced by the vanes 27 which slow the rotation and permit the material to drop out the bottom of conical portion 24 through outlet 25 and to the inside of tank 10. Solid material in tank 10 will settle in the direction of arrows 33. Once sufficient slurry accumulates on the inside of tank 10, pump 40 and pump 52 are started along with pump 77 which draws water from sump 20 and to the manifold 71 surrounding the outside of bell mouth 35. Fluid then flows through jets 72 which begins to agitate the slurry near bell mouth 35. Additional fluidizing jets 87 and 80 can be turned on by operating pumps 92 and 84, respectively, which draw their fluid from sump 20 through pipes 93 and 85, respectively, and pass the fluid down pipes 89 and 81, respectively, to the jets. With or without the slurry fluidized around the bell mouth 35, pump 40 can draw the slurry into bell mouth 35 around elbow 36 through pipe 37 into pump 40.

The apparatus shown in FIG. 1 includes a feature which permits careful control of density being drawn through pipe 37 to pump 40. This feature is not disclosed in this application but is disclosed in application Ser. No. 627,161 filed July 2, 1984 entitled "Apparatus for the Reclamation of Slurry from the Bottom of a Storage Silo" filed concurrently with this application. That feature is not a part of this invention; however, the density can be carefully controlled by adding fluids or reducing fluids entering port 64 by drawing water from sump 20 through pipe 53, inlet 54 and pump 52. The fluids are then outputted through outlet 57, pump 52 to pipe 62 to port 64.

It is obvious that fluids entering through pipes 21 and 30, along with the fluidizing jets 72, 87 and 80, all tend to contribute fluid to the inside of tank 10. Thus some overflow must be provided. In the embodiment disclosed, overflow is provided by a circular external enlarged portion 13 which has a higher top 15 than the tank top 14. Thus overflow will flow over top 14 and into the reservoir formed between enlarged portion 13 and side wall 11. The flow is then connected through overflow pipe 17 and pipe 19 to sump 20. This provides additional fluids to the sump as necessary to operate the various fluidizing jets. Thus the water 49 is recirculated over the weir formed by the top 14 of tank 10 and through the piping 19 to the sump 20. If necessary additional water can be added from a source 95 through pipe 96 to sump 20. Sump 20 must be provided with some means for removing the accumulated particulate material that passes in the direction of arrow 48 over the top 14 of tank 10. As determined by an actually constructed prototype, the amount and maximum size of particulate material passing over the top 14 is directly related to the flow rate of the fluids passing over the top 14.

Excess particulate material accumulating in sump 20 can be removed by any state of the art means. The amount requiring removal, however, will generally only be a small percentage of the total amount handled by the reclaim apparatus disclosed herein.

OPERATION OF THE SLURRY INPUT APPARATUS

Referring to FIG. 2 slurry handling pipe 21 contains solids, fluid and entrapped air. The entrapped air is extremely detrimental to the operation of the apparatus previously described for several reasons. The main reason is that, without the slurry input apparatus, the entrapped air serves as an additional source of turbulence in the top section of the tank. Increased turbulence results in an increased likelihood that a higher amount and larger solid particles will be carried out the overflow. The bubbling action of the entrained air could pick up additional solids from the bed 32 as well as keeping the solids from the source of slurry 29 in suspension. It is obvious that large quantities of material will be transferred from bed 32 to sump 20 as a consequence of the entrapped air. A second undesirable feature of entrapped air is the possibility of the creation of foam on the fluid surface 50 of tank 10. This foam can be created to the extent where it may pass over the top 15 of enlarged portion 13 causing many undesirable effects around the area outside the wall 11 of tank 10. In order to remove the entrapped air the slurry handling pipe 21 is mounted to a cylindrical portion 23 at a tangent so that the slurry will form a vortex inside cylindrical wall 23. The centrifugal force from the vortex action moves the heavier solid material in the direction of arrow 55 so that the solids 56 are against cylindrical wall 23. Gravity will then work the solids down cylindrical wall 23 to conical portion 24. In conical portion 24 is a section which contains a plurality of vanes 27. Once the rotating material strikes these vanes, the rotation will be reduced. The fluids, likewise rotating about the inside of the input device 22, will strike vanes 27 and be slowed in their rotation.

In view of the above the material passing out of outlet 25 will create much less turbulence to the fluids filling tank 10 and the solids forming bed 32. The lighter air which is entrapped in the slurry handling pipe 21 will migrate by centripetal force in the direction of arrow 59 toward the center of the vortex. It will then exhaust out of opening 9 of input device 22.

From the above it can be seen that the slurry passing downwardly by gravity to conical portion 24 will have substantially all of the entrapped air removed; therefore, as it falls in the direction of arrow 31 in bed 32, it will minimize the disturbance or turbulence being directed toward bed 32. Furthermore, the material entering tank 10 will have its rotation reduced, thus a minimizing disturbance to the bed 32. It is obvious, of course, that the more bed 32 is disturbed the more particles and larger particles will be suspended above bed 32 with the potential of being carried over the top 14 of tank 10. It is the main feature of this invention to prevent an excessive number of particles and reducing the size of particles from moving over the top 14 of tank 10 so that the cleaning of sump 20 will be kept to a minimum.

Two pipes 21 and 30 have been illustrated in FIG. 2. It is obvious that one or several pipes can enter inlet apparatus 22. It is, of course, desirable that they will enter at a tangent as illustrated in FIG. 2 for the same reasons discussed.

It is obvious that changes can be made in the application and still be within the spirit and scope of the invention as disclosed in the specification and appended claims.

What is claimed is:

1. In combination with a tank having a top and at least having a closed side and bottom for receiving mined material in the form of a fluid and particulate slurry that may contain entrapped air, an overflow means mounted through said side wall near said top, and means for removing fluid and particulate material mounted inside said tank near said bottom, a slurry inlet apparatus for turbulence reduction, comprising:

a. an inlet chamber first portion, said first portion having a top and a substantially circular side wall, said first portion being mounted inside said tank means so that the top of said chamber is substantially the same as the level of said overflow means, said top having a cover with an opening therein to permit air exhaust;

b. an inlet chamber second portion attached below said first portion, said second portion consisting of an inverted truncated cone terminating in an outlet port in communication with the inside of said tank, and having plural vanes attached radially to the inside wall adjacent the outlet port; and c. means for mounting an inlet pipe means tangentially to said inlet chamber first portion;

whereby mined material slurry containing entrapped air entering said inlet means will generate a vortex causing said air to move toward the center axis of said vortex for exhaust upward out of said fluid and particulate materials, and causing said solid particulate to move around the circular side wall of said first portion where gravity will transfer the fluids and particulates downward around said second portion and through the vanes and outlet port.

2. Apparatus as described in claim 1 wherein said inlet pipe means comprises a plurality of inlet pipes each secured to said inlet chamber first portion to provide tangential inlet flow of slurry material.

* * * * *